(12) United States Patent
Larsen, III et al.

(10) Patent No.: US 11,981,613 B2
(45) Date of Patent: May 14, 2024

(54) HYDROGEN ISOTOPE EXCHANGE METHODS AND SYSTEMS FOR ORGANIC AND ORGANOSILICON MATERIALS

(71) Applicant: BATTELLE SAVANNAH RIVER ALLIANCE, LLC, Aiken, SC (US)

(72) Inventors: George K. Larsen, III, Aiken, SC (US); Tyler C. Guin, Aiken, SC (US); Joseph E. Meany, Atlanta, GA (US); Jay B. Gaillard, Aiken, SC (US); Mark C. Elvington, Aiken, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 0 days.

(21) Appl. No.: 18/099,455

(22) Filed: Jan. 20, 2023

(65) Prior Publication Data

US 2023/0227380 A1    Jul. 20, 2023

Related U.S. Application Data

(60) Provisional application No. 63/301,235, filed on Jan. 20, 2022.

(51) Int. Cl.
| | | |
|---|---|---|
| *C07B 59/00* | (2006.01) | |
| *B01D 59/00* | (2006.01) | |
| *B01J 10/00* | (2006.01) | |
| *B01J 19/24* | (2006.01) | |

(52) U.S. Cl.
CPC ............ *C07B 59/001* (2013.01); *B01D 59/00* (2013.01); *B01J 10/007* (2013.01); *B01J 19/24* (2013.01); *C07B 2200/05* (2013.01)

(58) Field of Classification Search
CPC ... C07B 59/001; C07B 2200/05; B01D 59/00; B01J 10/007; B01J 19/24
See application file for complete search history.

(56) References Cited

U.S. PATENT DOCUMENTS

| | | |
|---|---|---|
| 2,690,381 A | 9/1954 | Taylor |
| 2,690,382 A | 9/1954 | Joris |
| 3,230,261 A | 1/1966 | Yavorsky et al. |
| 3,872,223 A * | 3/1975 | Spevack ............... B01D 59/32 423/563 |

(Continued)

FOREIGN PATENT DOCUMENTS

| | | |
|---|---|---|
| CA | 1081217 A | 7/1980 |
| DE | 279376 A3 | 6/1990 |

(Continued)

OTHER PUBLICATIONS

Atzrodt et al., Abstract "C—H Functionalisation for Hydrogen Isotope Exchange," Angewandte Chemie International Edition, vol. 57, pp. 3022-3047, 2018.

(Continued)

*Primary Examiner* — Ali Z Fadhel
(74) *Attorney, Agent, or Firm* — Dority & Manning, P.A.

(57) ABSTRACT

Disclosed are methods and systems for hydrogen isotope exchange of organic molecules that can be carried out with no alteration in the chemical structure of the organic molecules. Methods can be utilized to incorporate a particular hydrogen isotope on an organic molecule (e.g., deuteration or tritiation) or to remove a particular hydrogen isotope from an organic molecule (e.g., detritiation).

28 Claims, 5 Drawing Sheets

(56) References Cited

U.S. PATENT DOCUMENTS

| | | | | |
|---|---|---|---|---|
| 3,966,781 | A | * | 6/1976 | Atkinson .................. C11C 3/02 |
| | | | | 564/204 |
| 4,217,332 | A | * | 8/1980 | Hindin .................... B01D 59/32 |
| | | | | 976/DIG. 380 |
| 4,395,386 | A | * | 7/1983 | Asakura .................. C01B 13/11 |
| | | | | 376/301 |
| 4,444,737 | A | * | 4/1984 | Tsuchiya ................ B01D 59/33 |
| | | | | 423/580.2 |
| 4,514,377 | A | * | 4/1985 | Symons .................. B01D 59/32 |
| | | | | 422/186 |
| 4,533,539 | A | * | 8/1985 | Iniotakis ................... C01B 4/00 |
| | | | | 95/56 |
| 4,673,547 | A | * | 6/1987 | Iniotakis .............. G21C 19/303 |
| | | | | 376/314 |
| 4,707,342 | A | * | 11/1987 | Iniotakis .............. G21C 19/303 |
| | | | | 95/55 |
| 4,755,471 | A | | 7/1988 | Saito et al. |
| 5,221,768 | A | | 6/1993 | Kato et al. |
| 5,254,730 | A | | 10/1993 | Kilgore |
| 7,126,023 | B2 | | 10/2006 | Hirota et al. |
| 8,093,422 | B2 | | 1/2012 | Ito et al. |
| 11,058,994 | B2 | | 7/2021 | Xiao et al. |
| 2005/0163703 | A1 | * | 7/2005 | Sugiyama .............. B01D 59/32 |
| | | | | 422/600 |
| 2008/0177115 | A1 | | 7/2008 | Martinez et al. |
| 2018/0071678 | A1 | * | 3/2018 | Ludlow .................... C01B 5/02 |
| 2018/0209051 | A1 | * | 7/2018 | Baker .................... B01D 59/38 |
| 2018/0257933 | A1 | * | 9/2018 | Ludlow .................. B01D 59/12 |

FOREIGN PATENT DOCUMENTS

| | | |
|---|---|---|
| WO | WO 1985/04167 A1 | 9/1985 |
| WO | WO 2022/043993 A1 | 3/2022 |

OTHER PUBLICATIONS

Bowen et al., Abstract, "Global application of stable hydrogen and oxygen isotopes to wildlife forensics," Oecologia, vol. 143, pp. 337-348, 2005.

Daniel-Bertrand et al., Abstract, "Multiple Site Hydrogen Isotope Labelling of Pharmaceuticals," Angewandte Chemie International Edition, vol. 59, pp. 21114-21120, 2020.

Hsiao et al., "Preparation of Fully Deuterated Fatty Acids by Simple Method", Lipids, vol. 9,. No. 11, Jun. 19, 1974, 3 pages.

Jones et al., "Microwave-enhanced tritium-hydrogen exchange: application to radioactive waste reduction", Green Chemistry, vol. 4, pp. 464-466, 2002.

Lachawiec et al., Abstract, "Isotope tracer study of hydrogen spillover on carbon-based adsorbents for hydrogen storage," Langmuir, vol. 24, pp. 6159-6165, 2008.

Miller, J.M., "Survey of Tritiated Oil Sources and Handling Practices", The Canadian Fusion Fuels Technology Project, Aug. 1994, 18 pages.

Sazonov et al., "Interaction of Tritium with Oils and Tritiated Waste Oil Decontamination", Fusion Science and Technology, vol. 54, Aug. 2008, 5 pages.

Takeishi et al., "Tritium Contamination and Decontamination of Sealing Oil for Vacuum Pump", Fusion Science and Technology, vol. 67, Apr. 2015, 5 pages.

Tsuji et al., "The hydrogen/deuterium isotope effect of the host material on the lifetime of organic light-emitting diodes," Chemical Communications, vol. 50, pp. 14870-14872, 2014.

Werstiuk et al., "The High Temperature and Dilute Acid (HTDA) Procedure as a General Method of Replacing Aromatic Hydrogen by Deuterium. II $^{1-3}$", Department of Chemistry, McMaster University, Hamilton, Ontario, Sep. 11, 1973, 3 pages.

Werstiuk et al., "Hydrogen-deuterium exchange and rearrangement of polycyclic hydrocargons in dilute acid medium at elevated temperatures". Department of Chemistry, McMaster University, Hamilton, Ontario, Jul. 8, 1981, 2 pages.

\* cited by examiner

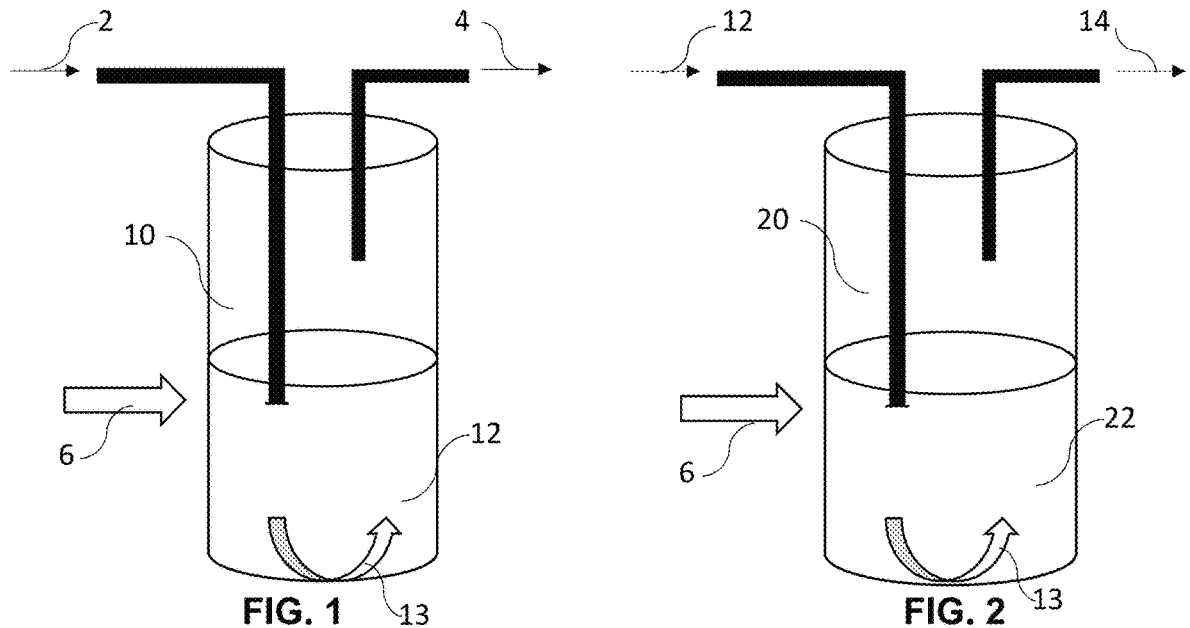
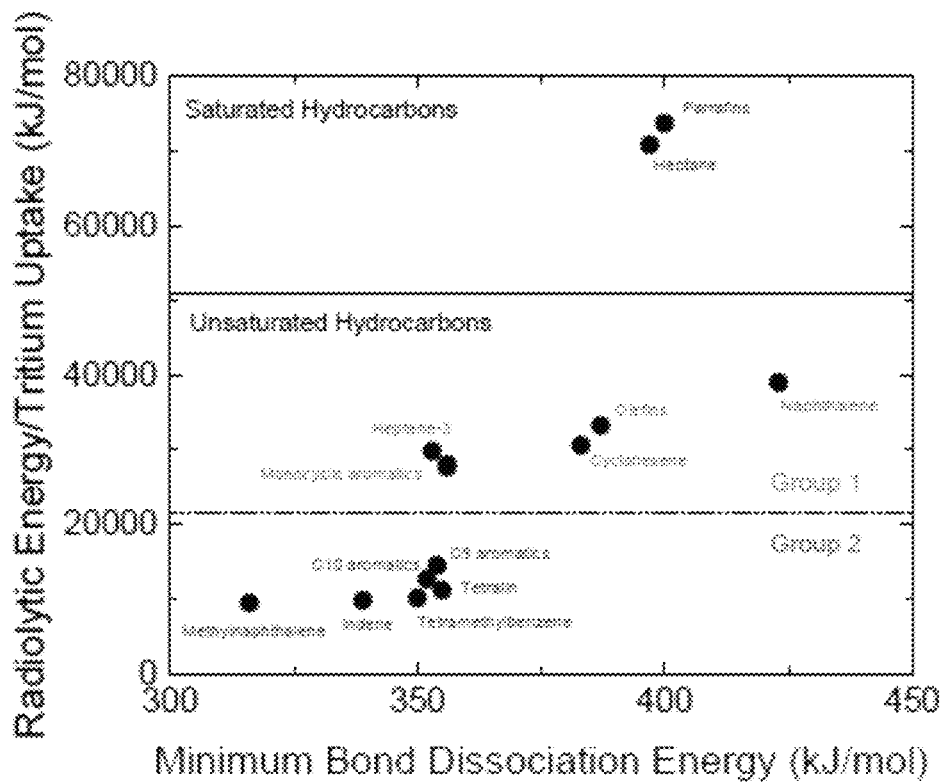
FIG. 3

HYDROGEN ISOTOPE EXCHANGE METHODS AND SYSTEMS FOR ORGANIC AND ORGANOSILICON MATERIALS

CROSS REFERENCE TO RELATED APPLICATION

This application claims filing benefit of U.S. Provisional Patent Application Ser. No. 63/301,235 having a filing date of Jan. 20, 2022, which is incorporated herein by reference for all purposes.

STATEMENT REGARDING FEDERALLY SPONSORED RESEARCH OR DEVELOPMENT

This invention was made with government support under Contract No. 893033210EM000080, awarded by the U.S. Department of Energy. The government has certain rights in the invention.

BACKGROUND

Tritium is a low energy beta emitter, and while it is not dangerous externally, it is a radiation hazard upon inhalation, ingestion, or absorption. In much nuclear- and plasma-based research and work, gaseous tritium ($T_2$) is produced. Tritium can be produced in nuclear power generation as a by-product of the fission of uranium-235, plutonium-239, and uranium-233, as well as by neutron activation of lithium-6. In heavy water moderated and cooled reactors, tritium can be produced when a deuterium nucleus captures a neutron. Though relatively small amounts of tritium are produced via such routes, it readily binds hydroxyl radicals. As such, tritium can build up over time within working fluids used in such processes.

There is a growing need to develop methods to remove tritium that has been incorporated into organic and organosilicon materials, such as oils, through their exposure in tritium processing systems as its incorporation into organic materials results in lost inventory, creates a health hazard, and poses a waste disposal challenge. Consequently, organic materials are categorically avoided in tritium processes. This becomes problematic because hydrocarbon and organosilicon oils are regularly used in all common industrial equipment, creating a lack of supply of critical process materials that support tritium processes for defense programs and the emerging fusion energy market.

Historically, the production of isotopically exchanged organic and organosilicon molecules through catalytic isotope exchange has been carried out by exposing an organic molecule-catalyst mixture in a heated, sealed vessel to $D_2$ gas or $D_2O$ liquid to produce deuterated molecules and to $T_2$ gas or $T_2O$ liquid to produce tritiated molecules. This process is insufficient if highly deuterated or highly tritiated molecules are desired because hydrogen isotope exchange is governed by the fundamental equilibria between the isotopologues in the two phases. In a sealed vessel, the $H_2$ gas or $H_2O$ liquid that is produced during the exchange remains in contact with the system and limits how much of the heavier isotope can be incorporated. Another issue is that the high pressure, high temperature environment of the sealed vessel may change the molecular structure of the target molecule. In some cases, this is intentional as a method for selective isotope exchange or as means to synthesize more complex isotopically exchanged molecules. However, the types of molecules that can be achieved in this manner are constrained by known chemical reaction pathways.

Existing isotope exchange issues are even more severe for the detritiation of compounds, e.g., organics and organosilicons used in tritium processing. In this case, the catalytic isotope exchange must be extremely efficient (>98%) in order to extract the tritium to meet safety and waste disposal requirements. In addition, molecular structure preservation of the detritiated material is necessary in order that the organic component retain functionality for recycle and reuse, which can greatly reduce costs.

There remains a need to achieve selectively or highly exchanged complex organic and organosilicon molecules in a manner that does not lead to alteration of the chemical structures.

SUMMARY

Disclosed are methods and systems for hydrogen isotope exchange of organic molecules (which, as utilized herein, encompasses organic molecules as well as organosilicon molecules) that can be carried out with no alteration in the chemical structure of the organic molecules. Methods can be utilized to incorporate a particular hydrogen isotope on an organic molecule (e.g., deuteration or tritiation) or to remove a particular hydrogen isotope from an organic molecule (e.g., detritiation or de-deuteration).

Methods generally include continuous flow of a hydrogen-containing stream containing a relatively high concentration of the hydrogen isotope of interest (one or more of protium, deuterium, or tritium) through a reactor for contact with the molecule of interest. In general, the reactor can contain the organic compound in conjunction with a suitable catalyst. The continuous outflow of the reactor carries both exchanged and unexchanged hydrogen isotopes, maintaining the reactor equilibrium favorable for further isotope exchange. A method can also include downstream processing of the reactor outflow, e.g., removal of impurities, isotope separation, etc. The organic material can then be utilized as desired, e.g., recycled as a detritiated working fluid to a tritium containing process, deuterated as a labeled organic, etc.

Also disclosed are working fluids for use in tritium-containing processes. The working fluids can include one or more organic components that exhibit resistance to radiation-induced modification as well as high isotope exchange characteristics. The working fluids can be particularly beneficial for use and recycle in a tritium-producing process. Organic components of disclosed working fluids can include polyaromatic hydrocarbons that can include one or more functional groups that are low in energy for isotope exchange.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 1 illustrates a reactor and process as may be utilized for deuterating a target molecule.

FIG. 2 illustrates a reactor and process as may be utilized for detritiating a target molecule.

FIG. 3 compares tritium uptake for several different organic materials.

Figure 4:
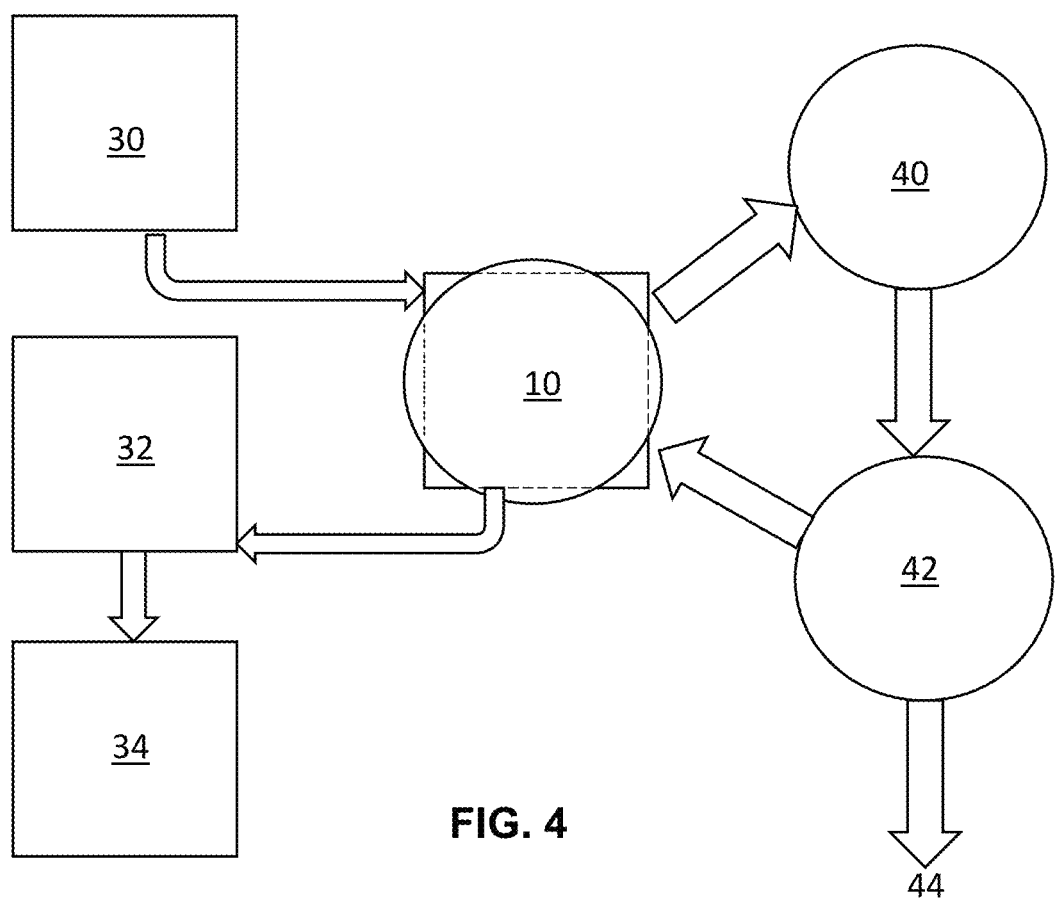
FIG. 4 illustrates a process for forming a deuterated organic or organosilicon material.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

Disclosed are methods and systems for hydrogen isotopic exchange on organic compounds, including hydrocarbons and organosilicon compounds. Methods include utilization of a continuously purged exchange reactor system to circumvent the equilibrium limitation of isotope exchange reactions.

Organic and organosilicon compounds as may be subjected to hydrogen isotopic exchange according to disclosed methods and systems can include, without limitation, oils, sealants, coatings, greases, solvents, polymers, pharmaceuticals, thermal transfer fluids, catalysts; organometallics, hydrocarbons, ethers, urethanes, polyols, silicones, silanols, siloxides, siloxanes, silyl ethers, silyl hydrides, etc., as well as combinations of materials.

In some embodiments, methods and systems can be utilized to incorporate a heavy hydrogen isotope (deuterium and/or tritium) onto an organic compound. FIG. 1 schematically illustrates one embodiment of a reactor for such a process. In this case, a pure or high concentration hydrogen isotope stream 2 (e.g., $D_2$) can continuously flow into the reactor 10 and interface therein with the organic or organosilicon molecules and catalysts 12. The organic or organosilicon material can be initially protonated and the protonated material and the catalysts can be mixed 13 or stationary, as desired, so as to provide a high surface area contact between the material, the catalysts, and the hydrogen isotope. To encourage isotopic exchange, process heat 6 can be supplied to the reactor 10. Process heat 6 can be supplied via any suitable system including, without limitation, conventional heating, microwave heating, radiofrequency (RF) heating, etc. In some embodiments, a cooling system can be incorporated, which can cool the reactor contents according to any suitable cooling process. The outlet flow 4 can carry away both the exchanged and unexchanged hydrogen isotopes. The continuous flow through the reactor can maintain favorable equilibrium for isotope exchange.

In some embodiments, methods and systems can be utilized to remove a heavy hydrogen isotope (deuterium and/or tritium) from an organic compound. FIG. 2 schematically illustrates one embodiment of a reactor for such a process. In this case, a pure or high concentration protium isotope stream 12 (e.g., $H_2$) can continuously flow into the reactor 20 and interface therein with the organic or organosilicon molecules and catalysts 22. The organic or organosilicon material of the mixture 22 can initially include one or more heavy hydrogen isotopes. For instance, the material can be a working fluid obtained from a tritium producing process. The material and the catalysts can be mixed 13 or stationary, as desired, to provide a high surface area contact between the material, the catalysts, and the protium. To encourage isotopic exchange, process heat 6 can be supplied to the reactor 10. Process heat 6 can be supplied in some embodiments via any suitable system including, without limitation, conventional heating, microwave heating, radiofrequency (RF) heating, etc. In some embodiments, a cooling system can be incorporated, which can cool the reactor contents according to any suitable cooling process. The outlet flow 14 can carry away both the exchanged and unexchanged hydrogen isotopes. As with the above-described embodiment, the continuous flow through the reactor can maintain favorable equilibrium for isotope exchange.

In some embodiments, a working fluid to be treated according to a detritiation reaction scheme can include an organic compound that has been selected for desirable properties in a tritium-containing process. For instance, a working fluid (e.g., a lubricating oil) can include an organic compound that exhibits resistance to radiation-induced modification as well as to hydrogens having high relative energies for isotope exchange. For instance, FIG. 3 presents data regarding the relationship between tritium radiolytic energy/tritium uptake and minimum bond dissociation energy for several different hydrocarbons including saturated hydrocarbons (e.g., paraffins, heptane) and unsaturated hydrocarbons (e.g., heptane-3, monocyclic aromatics, olefins, cyclohexene, maphalene, methylnaphpthalene, indene, D10 aromatics, C9 aromatics, tetralin, and tetramethylbenzene). The materials can be utilized as a working fluid in a process or may be included as an additive with one or more other components (e.g., a more traditional working fluid for the process) or may be included as the primary component of the working fluid. In such a case, the material will exhibit useful properties for their intended application. For example, a compound for use as a vacuum oil, in addition to the above properties, should also exhibit a low vapor pressure.

Examples of organic materials useful as primary working fluids and/or additives to a working fluid that exhibit desirable properties in a tritium-containing process can include, without limitation, aliphatic hydrocarbons (e.g., mineral oils, including purified mineral oil), tetramethyl tetraphenyl trisiloxane, pentaphenyl trimethyl trisiloxane, and polyphenyl ethers such as alkyl diphenyl ether, pentaphenyl ether (5-ring polyphenyl ether), tetraphenyl ether (4-ring polyphenyl ether), monoalkyl tetraphenyl ether, dialkyl tetraphenyl ether, alkyl diphenyl ether, as well as combinations thereof.

In some embodiments, a working fluid or an additive thereto as may be processed according to a detritiation process as described can include a radiation stable polyaromatic hydrocarbon. In some embodiments, the radiation stable polyaromatic hydrocarbon can include a functional group that is lower in energy for isotope exchange. Polyaromatic hydrocarbons encompassed herein can include, without limitation, naphthalene, tetralin, dialin, benzene, diphenylmethane, 9,10-dihydroanthracene, biphenyl, phenanthrene, 9,10-dihydrophenanthrene, anthracene, pyrene, or any combination thereof. For instance, a working fluid can incorporate a polymer, including one or more of the above in a backbone of the polymer.

A polyaromatic hydrocarbon component of a working fluid can, in some embodiments, include one or more functionalities that exhibit desirable isotope exchange characteristics. Functional groups can include, without limitation, methyl, ethyl, vinyl, ethanol, acid, aldehyde, ketone, hydrocarbon oxide, alkene, or any combination thereof. In some embodiments, the location of the functional group can be utilized to further improve isotopic exchange characteristics of the material. For instance, in some embodiments, a functional group added to the 1- or 2-carbon of an additive can exhibit improved isotopic exchange characteristics as compared to other locations.

Exemplary functionalized naphthalene-based hydrocarbons can include, without limitation, the following naphthalene-based materials:

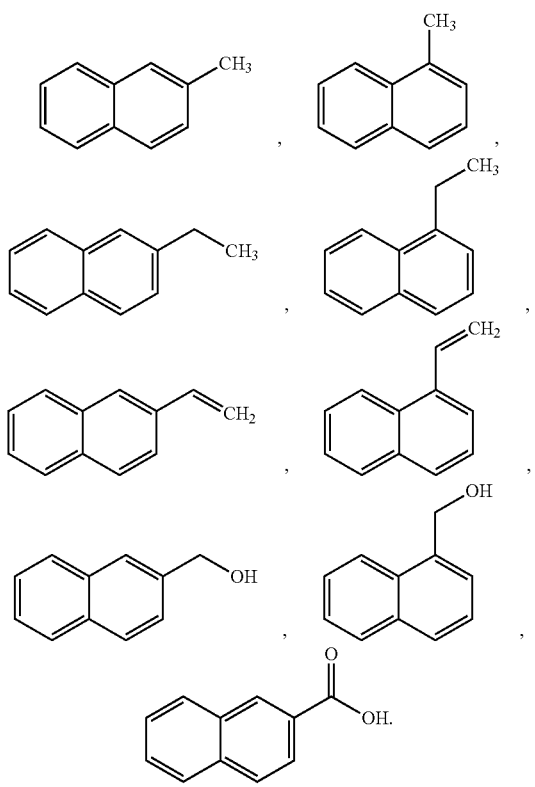

Independent of the particular isotope exchange(s) carried out in the reactor (e.g., deuteration, detritiation, etc.), the hydrogen isotope-containing flow to the reactor can be in any desired phase (gas, vapor, liquid) and with any relative content of hydrogen isotopes. For instance, the inflow to an exchange reactor can include protium, deuterium, or tritium, either alone or in any combination with one another. In addition, the inflow can carry the hydrogen isotope(s) in conjunction with a carrier, e.g., an inert carrier. Inlet flow can be in the form of, for instance and without limitation, water, heavy water, tritiated water, methane, deuterated methane, tritiated methane, combinations thereof, etc., and optionally with an inert carrier, e.g., argon.

The reactor can be a bubble-type reactor as illustrated in FIG. 1 and FIG. 2 but is not limited to such. For example, reactor types can include, without limitation, monolithic reactors, bubble columns, slurry reactors, trickle beds, etc. In addition, the materials that flow through the column can be limited to the hydrogen-containing gaseous flow, or both the hydrogen-containing gaseous flow and the organic material can both flow through the reactor, e.g., in a counter-current flow. Thus, flow of the hydrogen-containing component in and out of the reactor can be continuous (e.g., 2 and 4 in FIGS. 1 and 12 and 14 in FIG. 2), with any desired flow rate, while the organic components to be treated can be present in the reactor as either a batch process, as a continuous flow through the reactor, or some combination thereof.

Temperatures and pressures within an exchange reactor can generally vary, with preferred values related to the stability of target molecule as well as kinetics of the isotopic exchange reactions, with both temperatures and pressures encompassing ambient, as well as above and below ambient.

Catalysts for the exchange reactions can include those as generally known in the art, which can be supported on materials, as is known, e.g., porous support materials. Without limitation, catalysts can include Pt, Pd, Ru, Ni, Rh, Co, Mo; bimetallic combinations thereof; and organometallic compounds thereof. Catalyst supports may be, without limitation, carbon, metal oxides, silicates, aluminosilicates, zeolites, or inactive metals. By way of example, zeolites (also commonly referred to as molecular sieves) as may be utilized can include low silica (aluminum rich) zeolites A and X (e.g., type 3A, type 4A, type 5A, type 13X). By way of example, the support material can include porous particles that have an average diameter in the millimeter range (e.g., about 5 millimeters or less) and that can have a large surface area, e.g., about 100 square meters per gram ($m^2/g$) or greater, about 200 $m^2/g$ or greater, or about 300 $m^2/g$ or greater. In general, the average pore diameter can generally be on the order of about 500 Angstroms (Å) or less, for instance about 300 Å or less, or about 200 Å or less, in one embodiment.

In some embodiments, the flow-through reactor can be coupled with a hydrogen isotope processing system for forming a molecule that carries a heavy hydrogen isotope. For instance, FIG. 4 provides a representative flow diagram for the deuteration of an organic or an organosilicon molecule. The square blocks and arrows therebetween represent the organic/organosilicon flow of the process, while the circular blocks show the hydrogen flow. As illustrated, a feed material 30 including a molecule to be labeled with a hydrogen isotope (e.g., deuterium) can be fed to a reactor 10 within which catalytic isotope exchange can take place. Following, the labeled molecule, e.g., a fully deuterated organic or organosilicon molecule, can be removed from the reactor 10 and optionally, subjected to further processing 32, e.g., purification, prior to desired use 34, e.g., as a labeled compound in a biomedical experiment.

An organic compound can be labeled with a heavy hydrogen isotope according to disclosed methods for any purpose. For instance, in addition to biomedical applications, it may be useful in some embodiments to deuterate a solvent, e.g., an ether-containing or a carbonate-containing solvent. Examples of solvents as may be labeled according to disclosed methods can include, without limitation, dimethyl carbonate, diethyl carbonate, dipropyl carbonate, propylene carbonate, ethylene glycol, polyethylene glycol, polyethylene oxide, glycerol, tetrahydrofuran, isopropanol, cyclohexane, octane, pentane, or any combination thereof.

On the hydrogen flow side of the process, the continuous hydrogen-containing flow into the reactor can include a high concentration of the heavy hydrogen isotope label, e.g., deuterium in a concentration of from about 1 wt. % to about 100 wt. % of the total hydrogen content of the input flow.

Following the exchange process within the reactor, the continuous hydrogen-containing flow that exits the reactor 10 can be processed for impurity removal 40 following outflow from the catalytic isotope exchange reactor 10 and for isotope recovery 42, during which the hydrogen-isotope flow can be processed to recover the heavy isotope label, e.g., deuterium, for recycle back to the isotope exchange reactor 10. Purified hydrogen flow 44 can be released from the system as emissions or collected for other uses.

Figure 5:
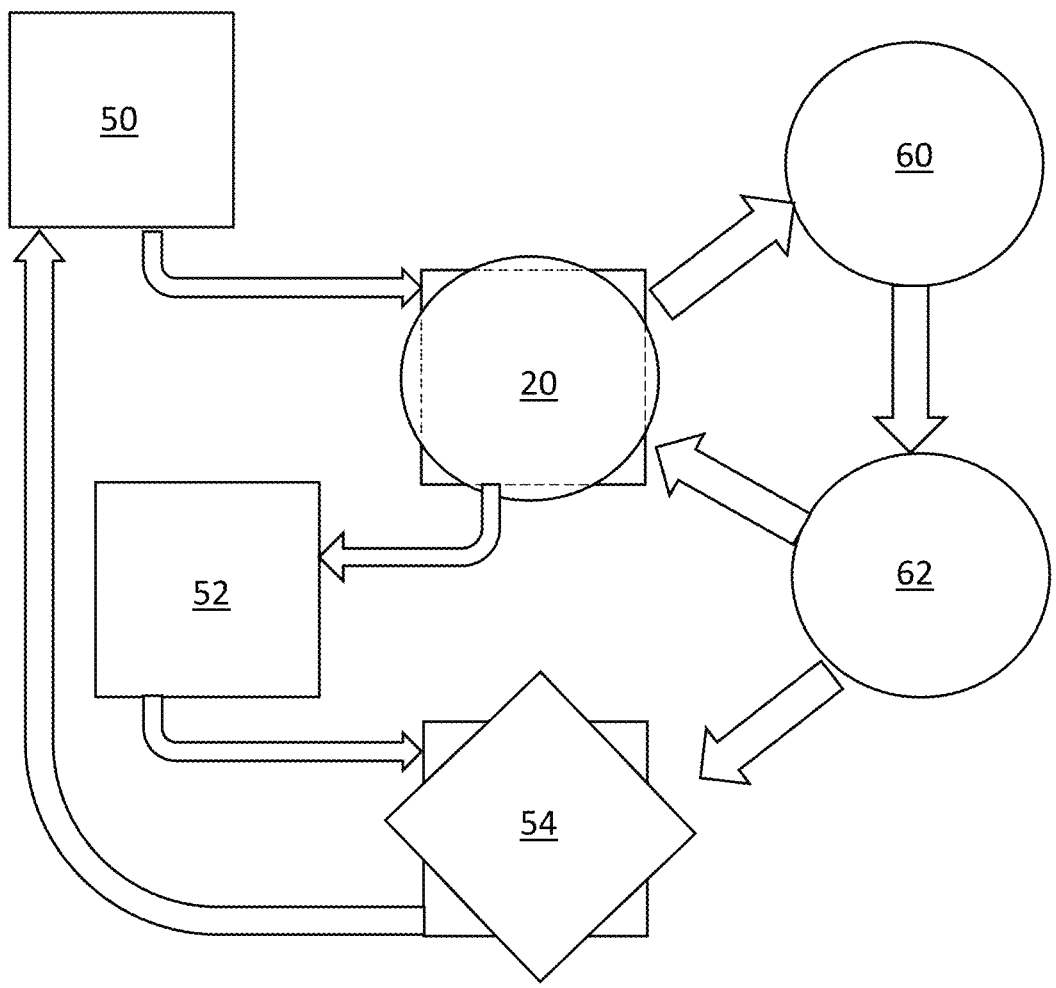
FIG. 5 illustrates a process for detritiating an organic or organosilicon material.

FIG. 5 provides a representative flow diagram for isotope exchange to remove a heavy hydrogen isotope (deuterium and/or tritium) from an organic or an organosilicon molecule. For instance a process can detritiate a working fluid that was exposed to tritium while serving in a tritium-containing system 54. The square blocks and arrows of FIG. 5 represent the working fluid flow, while the circular blocks represent the hydrogen flow. As illustrated, a feed working fluid 50 including a tritiated molecule can be fed to a reactor 20 within which catalytic isotope exchange can take place. Following, the detritiated working fluid can be removed 52 from the reactor 20 and recycled to the tritium-containing system 54. As indicated, a system can remove tritium from the working fluid of the tritium-containing system 54 in a continuous or batch cycle.

On the hydrogen flow side of the process, the continuous flow pulled off of the catalytic exchange reactor 20 can include tritium and this flow can be processed for impurity removal 60 following outflow from the reactor 20 and can also be processed for isotope separation 62. The separated protium flow can be returned to the catalytic exchange reactor 20, and the separated tritium can be returned to the tritium-containing system 54. In other embodiments, in which the tritium is produced as a by-product of the system, the separated tritium can be collected for disposal or other use.

Impurity removal from a hydrogen isotope-containing outflow from an exchange reactor can be carried out according to known processes, e.g., by use of palladium membranes as in a palladium membrane reactor, catalyst beds, getters, etc., as well as combinations of impurity removal techniques.

Isotope separation of an outflow stream can be carried out according to any suitable process including, without limitation, cryogenic distillation, thermal cycling absorption, etc.

Figure 6:
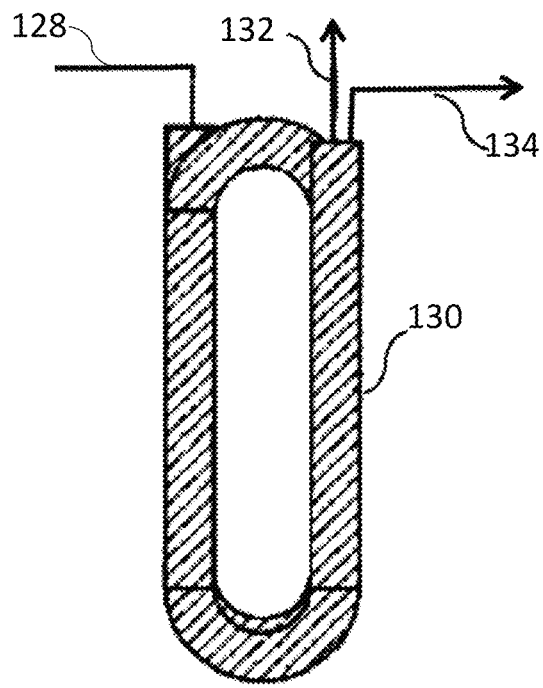
FIG. 6 illustrates an isotope separation column as may be incorporated into a system as described herein.

For instance, in one embodiment, a tritium-enriched gaseous flow exiting an isotope exchange reactor 20 can include tritium in a relatively high concentration, for instance about 5 ppm or greater, about 10 ppm or greater, or about 100 ppm or greater. In one embodiment, the enriched gaseous flow can be further processed for recovery of tritium, for instance according to a thermal cycling adsorption process (TCAP). One embodiment of a TCAP that may be utilized has been described in U.S. Pat. No. 8,470,073 to Heung, et al., which is incorporated herein by reference. FIG. 6 illustrates one embodiment of a TCAP as may be incorporated in a system. In this embodiment, an inverse column 130 can be utilized that separates the enriched gaseous outflow 128 into a tritium stream 132 and a protium stream 134.

According to one embodiment, an inverse column 130 can include an adsorbent that preferentially adsorbs the heavier hydrogen isotope. That is, the adsorbent of the column 130 adsorbs tritium better than deuterium, and deuterium better than protium. During use, the column 130 can be heated and cooled to cycle the temperature between a low temperature and a high temperature. The specific temperatures of the cycle can vary depending upon the specific adsorbent used. For instance, in one embodiment, the column 130 can be cycled between about 90° C. and about 180° C. At the lower temperature, the inverse column can adsorb protium (and preferentially the heavier isotope(s) of hydrogen) and at the higher temperature, the adsorbed protium can be released. The amount of the heavy hydrogen isotope that is adsorbed by the column can vary depending upon flow rate and pressure of the gas.

Adsorbents for use in the inverse column 130 can include, without limitation, a molecular sieve, activated carbon, alumina, silica, silica-alumina, clays, or mixtures of materials. Molecular sieves as may be utilized can include, for example, type 3A, type 4A, type 5A, type X, type Y, ZSM-5, Mordenite, type L, Omega, or other types having 3-10 Angstrom pore diameters that preferentially adsorb the heavier hydrogen isotopes. Transition metals, such as vanadium and chromium and their alloys, that can preferentially absorb hydrogen isotopes and have isotopic effects similar to the molecular sieves can also be used.

During use, an inverse column 130 is alternatively heated and cooled. During the cool cycle, the tritium of the enriched gaseous flow is preferentially adsorbed by the inverse column, and the output line 134 can contain primarily the lighter isotope (protium). During the hot cycle, the adsorbed material is released, and the output line 132 can contain primarily the heavier isotope (tritium).

In some embodiments, the gaseous flow off of a catalytic isotope exchange reactor 20 can include deuterium in conjunction with tritium and protium. In this embodiment, it may be desired to separate all three isotopes from one another to obtain three product lines: one including primarily protium, one including primarily deuterium, and one including primarily tritium. In this embodiment, multiple separation columns can be utilized in series in an isotope separation process 62 to separate the three isotopes from one another.

For instance, a first and second separation column can incorporate an adsorbent that preferentially adsorbs the lighter hydrogen isotopes and thus has the opposite isotopic effect of an inverse separation column as described above. For instance, first and second separation columns can incorporate a palladium adsorbent that adsorbs the hydrogen isotopes in order by preference of protium>deuterium>tritium. In addition, the adsorbent of the first and second separation columns can adsorb hydrogen isotopes at a low temperature and release the adsorbed hydrogen isotopes at an increased temperature.

The adsorbent, e.g., palladium, can be supported on an inert support material, such as diatomaceous earth (also known as kieselguhr), which does not directly adsorb or separate hydrogen isotopes but can function as support for the adsorbent (e.g., palladium) to increase reaction kinetics and to reduce pressure drop as the gas flows through the columns.

When utilizing a palladium adsorbent, the separation columns can be cycled from a low temperature of about 90° C. to a high temperature of about 180° C. At the lower temperature, hydrogen is adsorbed onto the adsorbent, with preference for protium adsorption, and at the higher temperature, the adsorbed materials are released from the adsorbent.

During an isotope separation process, the enriched gaseous flow can flow to a first separation column, which can contain an adsorbent that preferentially adsorbs the lighter hydrogen isotopes. During the cold portion of the cycle, protium can be preferentially adsorbed within the column and the exit stream from the column can include deuterium and tritium of the input gas flow as well as any protium that was not adsorbed within the column. During the hot portion of the cycle, the adsorbed protium can be released from the adsorbent and a product stream that includes primarily protium can be obtained.

The stream that exits the first separation column can enter a second separation column and the process of the first separation column can be repeated to separate any remaining protium from the feed stream. Thus, the exit stream from the second separation column that exits the column during the cold phase of the cycle will include deuterium and tritium, and the exit stream that exits the second separation column that exits the column during the hot phase of the cycle will include protium.

A third separation column can be an inverse column as described above and can include an adsorbent that preferentially adsorbs the heavier isotope, tritium, during the cold phase of the cycle. Thus, the exit stream that exits the inverse column during the cold phase of the cycle can include primarily deuterium, and the exit stream that exits the inverse column during the hot phase of the cycle can include primarily tritium.

Tritium that is separated and recovered according to a disclosed process and system can be suitable for any use as is known in the art. For instance, the recovered tritium can be recycled to a tritium-containing process that utilizes tritium, as described above. In other embodiments, the separated tritium can be collected and utilized in self-powered lighting applications as a replacement for radium, as a fuel for controlled nuclear fusion reactions, or can be provided to a catalytic exchange system as described above and utilized as a chemical tracer, for instance as a radiolabel of an organic or organosilicon material or as a tracer in ocean circulation and ventilation.

Disclosed methods and systems can be utilized in many different industries including, without limitation, fusion, defense, pharmaceutical, biomedical, LED, semiconductor, optical fiber, polymer, etc.

The present disclosure may be better understood with reference to the Examples set forth below.

Example

Figure 7:
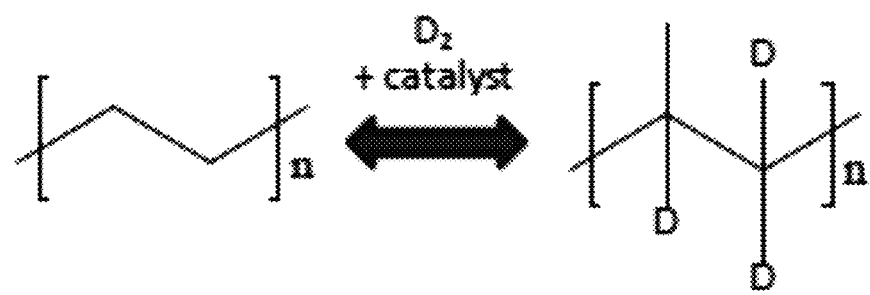
FIG. 7 illustrates an example of deuteration of an organic molecule.

Isotope exchange of a mineral oil was performed. The full deuteration exchange reaction is indicated in FIG. 7.

Figure 8:
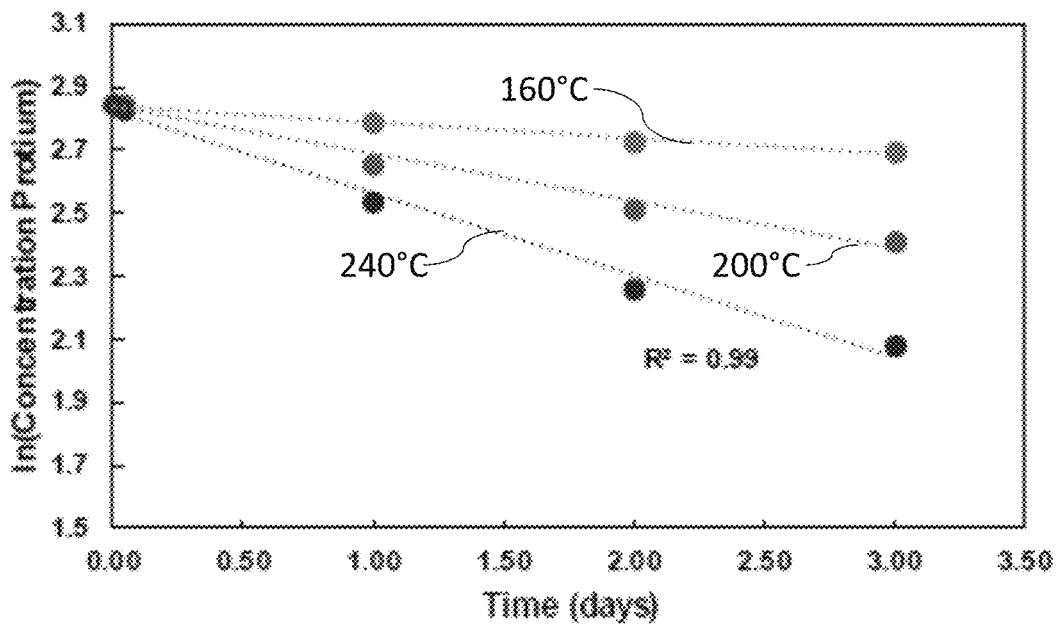
FIG. 8 graphically illustrates efficiency of isotopic exchange over time for deuteration of a compound according to disclosed methods.
Figure 9:
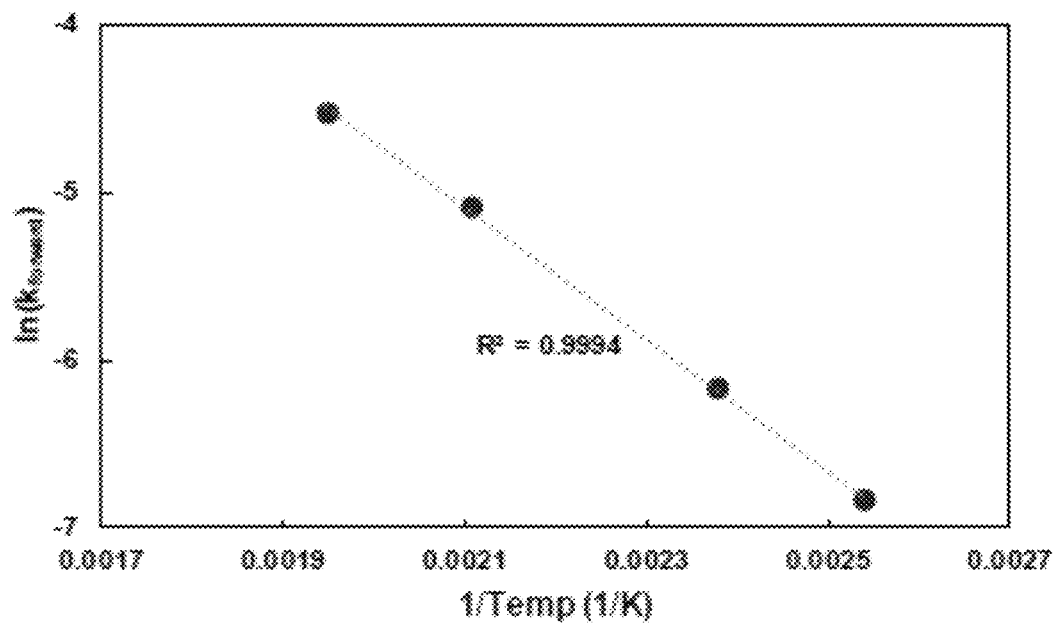
FIG. 9 graphically illustrates efficiency of isotopic exchange with temperature for deuteration of a compound according to disclosed methods.

Deuteration was performed under pure $D_2$ in a round bottom flask, heated via a heating mantle. $D_2$ or argon (for purging) was introduced through a stainless steel cannula into the bulk of the oil. Stirring was set to 200 RPM and the stir bar was coated with PTFE. LVO 500 and Pt/C were heated under argon to the set temperature (160° C., 200° C., and 240° C. each in a different run; confirmed via external thermocouple) and then exposed to $D_2$. The flow rate was set to 25 sccm per 5 g of oil. Aliquots of oil were removed through a separate cannula and glass syringe. Catalyst was separated by dissolving the viscous oil into hexane (~1:2 hexane : LVO 500), centrifuging at 3500 RPM for 20 minutes, and then removing the supernatant. Hexane was removed by initial drying at 90° C., then 80° C. under vacuum overnight. Results are illustrated in FIG. 8, and FIG. 9. Exchange was highly efficient—over 98% exchange with 2% catalyst—compared to literature-best 40% exchange with 20% catalyst.

While certain embodiments of the disclosed subject matter have been described using specific terms, such description is for illustrative purposes only, and it is to be understood that changes and variations may be made without departing from the spirit or scope of the subject matter.

What is claimed is:

1. A method for hydrogen isotope exchange on an organic molecule, the method comprising:
    flowing a stream containing a first hydrogen isotope into and out of a reactor, the reactor containing the organic molecule and a hydrogen isotope exchange catalyst, the stream contacting the organic molecule within the reactor, a portion of the first hydrogen isotope being exchanged for a second, different hydrogen isotope of the organic molecule as the stream is within the reactor; and
    removing one or more impurities from the stream following exit of the stream from the reactor.

2. The method of claim 1, wherein the first hydrogen isotope comprises deuterium or tritium, and wherein the organic molecule is deuterated or tritiated upon the hydrogen isotope exchange.

3. The method of claim 2, wherein the organic molecule is a solvent.

4. The method of claim 3, wherein the solvent comprises an ether or a carbonate.

5. The method of claim 3, wherein the solvent comprises dimethyl carbonate, diethyl carbonate, dipropyl carbonate, propylene carbonate, ethylene glycol, polyethylene glycol, polyethylene oxide, glycerol, tetrahydrofuran, isopropanol, cyclohexane, octane, pentane, or any combination thereof.

6. The method of claim 1, wherein the first hydrogen isotope is protium and the second hydrogen isotope comprises deuterium or tritium, and wherein the organic molecule is detritiated or de-deuterated upon the hydrogen isotope exchange.

7. The method of claim 6, wherein the organic molecule is a component of a working fluid in a process that produces tritium, the method further comprising recycling the working fluid to the process.

8. The method of claim 6, wherein the organic molecule comprises a polyaromatic hydrocarbon, an organosilicon molecule, or an aliphatic hydrocarbon.

9. The method of claim 8, wherein the polyaromatic hydrocarbon comprises naphthalene, tetralin, dialin, benzene, diphenylmethane, 9,10-dihydroanthracene, biphenyl, phenanthrene, 9,10-dihydrophenanthrene, anthracene, pyrene, a polyphenyl ether, or any combination thereof.

10. The method of claim 8, wherein the polyaromatic hydrocarbon comprises a functional group, the functional group comprising methyl, ethyl, vinyl, ethanol, acid, aldehyde, ketone, hydrocarbon oxide, alkene, or any combination thereof.

11. The method of claim 10, wherein the functional group is at the 1- or 2-carbon of the polyaromatic hydrocarbon.

12. The method of claim 1, wherein the method is a continuous process.

13. The method of claim 1, wherein the method is a batch process.

14. An isotope exchange system comprising:
    a reactor containing an isotope exchange catalyst and an organic molecule;
    a stream containing a hydrogen isotope in fluid communication with the reactor, the fluid contact configured for flow of the stream into and out of the reactor and further configured for contact between the hydrogen isotope and the organic molecule within the reactor; and
    a hydrogen isotope separation unit in fluid communication with the stream such that following exit from the reactor, the stream is fed to the hydrogen isotope separation unit.

15. The isotope exchange system of claim 14, wherein the hydrogen isotope comprises deuterium, the stream flowing into the reactor comprising the deuterium at a concentration of from about 1 wt. % to about 100 wt. % of the total hydrogen content of the stream.

16. The isotope exchange system of claim 14, the system further comprising a hydrogen isotope recycle line between the hydrogen isotope separation unit and the reactor.

17. The isotope exchange system of claim 14, wherein the stream flowing out of the reactor contains tritium at a concentration of from about 5 ppm or greater.

18. The isotope exchange system of claim 17, wherein the hydrogen isotope separation unit comprises a thermal cycling adsorption unit or a cryogenic distillation unit.

19. The isotope exchange system of claim 14, further comprising a tritium-containing system, wherein the tritium-containing system is in fluid communication with the reactor.

20. The isotope exchange system of claim 19, wherein the organic molecule is a component of a working fluid of the tritium-containing system.

21. A method for hydrogen isotope exchange on an organic molecule, the method comprising:
flowing a stream containing a first hydrogen isotope into and out of a reactor, the reactor containing the organic molecule and a hydrogen isotope exchange catalyst, the stream contacting the organic molecule as the stream is within the reactor, a portion of the first hydrogen isotope being exchanged for a second, different hydrogen isotope of the organic molecule as the stream is within the reactor; and
separating the first hydrogen isotope from the second hydrogen isotope contained in the stream from one another following exit of the stream from the reactor.

22. The method of claim 21, further comprising recycling the separated first hydrogen isotope back to the reactor.

23. The method of claim 21, wherein the first hydrogen isotope comprises deuterium or tritium, and wherein the organic molecule is deuterated or tritiated upon the hydrogen isotope exchange.

24. The method of claim 23, wherein the organic molecule is a solvent.

25. The method of claim 21, wherein the method is a continuous process.

26. The method of claim 21, wherein the method is a batch process.

27. The method of claim 21, wherein the first hydrogen isotope is protium and the second hydrogen isotope comprises deuterium or tritium, and wherein the organic molecule is detritiated or de-deuterated upon the hydrogen isotope exchange.

28. The method of claim 27, wherein the organic molecule is a component of a working fluid in a process that produces tritium, the method further comprising recycling the working fluid to the process.

* * * * *